United States Patent
Baker, Jr.

[11] Patent Number: 5,935,301
[45] Date of Patent: Aug. 10, 1999

[54] MIST SEPARATOR APPARATUS

[75] Inventor: James B. Baker, Jr., Woodland, Wash.

[73] Assignee: SEH America, Inc., Vancouver, Wash.

[21] Appl. No.: 08/964,604

[22] Filed: Nov. 5, 1997

[51] Int. Cl.$^6$ .................................................. B01D 45/04
[52] U.S. Cl. ........................... 95/267; 55/385.1; 55/319; 55/423; 55/462
[58] Field of Search ................................ 95/172, 175, 247, 95/266, 246, 267; 96/193, 188, 189; 55/385.1, 385.2, 423, DIG. 18, 319, 462, 465

[56] References Cited

U.S. PATENT DOCUMENTS

| | | | |
|---|---|---|---|
| 1,227,278 | 5/1917 | Lindstrom | 55/462 |
| 1,234,316 | 7/1917 | Elliott | 55/462 |
| 1,335,602 | 5/1920 | Pradairol | 55/462 |
| 1,415,818 | 5/1922 | Engel, Sr. | 55/462 |
| 1,455,348 | 5/1923 | Moffat | 55/462 |
| 1,668,488 | 5/1928 | Bossey | 55/462 |
| 1,680,255 | 8/1928 | Poston | 55/465 |
| 2,765,045 | 10/1956 | Meyers | 95/247 |
| 2,917,386 | 12/1959 | Jones et al. | 55/462 |
| 3,570,221 | 3/1971 | Oliver | 55/462 |
| 4,012,209 | 3/1977 | Mcdowell et al. | 55/465 |
| 4,036,615 | 7/1977 | Heintzelman | 55/442 |
| 4,069,154 | 1/1978 | Barloy | 95/266 |
| 5,188,647 | 2/1993 | Brookfield et al. | 55/462 |

FOREIGN PATENT DOCUMENTS

| | | | |
|---|---|---|---|
| 1029992 | 7/1983 | U.S.S.R. | 55/462 |

*Primary Examiner*—Duane S. Smith
*Attorney, Agent, or Firm*—Oliff & Berridge, PLC

[57] ABSTRACT

A mist separator apparatus removes a mist and a liquid material from a chamber defined by a structure and includes a mist collecting container and a drain tube. The mist collecting container defines a plenum and has a vent and a collecting drain which are in fluid communication with the plenum. The mist collecting container is connected to the structure and is in fluid communication with the chamber for receiving the mist into the plenum. The drain tube is connected to and between the structure and the collecting drain and is in fluid communication with the chamber and the collecting drain so that the liquid material flows from the chamber and into the collecting drain.

22 Claims, 4 Drawing Sheets

MIST SEPARATOR APPARATUS

BACKGROUND OF THE INVENTION

The invention relates to a mist separator apparatus that removes mist and liquid from structures containing the same.

Many types of equipment that cut or otherwise form workpieces fabricated from hard material such as metal, ceramics or plastics sometimes require a cooling fluid to cool both the cutting tool and the workpiece as it is being cut or formed. One type of equipment is a wafer slicing machine 2 as schematically illustrated in FIG. 1 for purposes of explanation only. Generally, the wafer slicing machine 2 includes a housing 4 and a cutting assembly 6. A saw blade 8 connected to a shaft 10 is enclosed within the housing 4 and a motor 12 disposed exteriorly of the housing 4 drives the saw blade 8 to cut workpiece 14. Because a significant amount of heat is generated when cutting the workpiece 14 with the rotating saw blade 8, a liquid coolant 18, such as water or oil, is sprayed onto the rotating saw blade 8 and the workpiece 14 through a nozzle 20.

Much of the liquid coolant 18 which now contains minute particles of the workpiece 14 accumulates at the bottom of the housing 4. A mist M is also generated as a result of spraying the liquid coolant 18 onto the rotating saw blade 8 and the workpiece 14. For the wafer slicing machine 2 to operate efficiently, the liquid coolant 18 that now contains minute particles of the workpiece 14 must be drained from the housing 4 and the mist, some of which also contains minute particles of the workpiece 14, must be exhausted from the housing 4.

A conventional drain/exhaust system 22 is illustrated in FIG. 1. A header 24 is attached exteriorly near the bottom of the housing 4 so that accumulated liquid coolant containing minute particles of the workpiece 14 can drain from the housing 4 through a drain pipe 26. Also, the mist M migrates from the housing 4 through the header 24 and into a leading exhaust pipe 28 into a canister 30. While in the canister 30, the heavier mist droplets tend to settle toward the bottom of the canister 30 while the lighter mist droplets are exhausted through a trailing exhaust pipe 32. As commonly known in the art, a slight vacuum is applied to the trailing exhaust pipe 32 to draw the lighter mist droplets therethrough.

As the heavier mist droplets accumulate at the bottom of the canister 30, a sludge-like material forms. If sufficiently wet, the sludge flows through a canister drain pipe 34 for disposal.

Unfortunately, if excessive mist droplets are being exhausted through the trailing exhaust pipe 32, the sludge-like material tends to thicken and, as a result, does not effectively drain from the canister 30. Thus, a door 36 on the canister 30 must be opened to gain access into the canister 30 so it can be purged of the stagnate sludge-type material. Cleaning the canister 30 is messy and labor-intensive. Ironically, excessive mist droplets being exhausted through the trailing exhaust pipe 32 is known to be detrimental to the exhaust portion of the drain/exhaust system 22.

There is a need in the industry to provide a mist separator that removes a mist and a liquid material more efficiently and effectively from cutting or forming equipment. It would advantageous if the mist separator apparatus eliminates the use of the canister in order to eliminate the need to periodically clean the sludge-like material therefrom. It would also be advantageous if the mist separator apparatus can simultaneously reduce the amount of mist being exhausted through the vacuum-driven exhaust system while simultaneously increasing the amount of mist precipitating as liquids so the liquids can drain through the drainage system. There is also a need to provide a mist separator apparatus that inhibits the mist from directly entering into the drain/exhaust system. It would be advantageous to provide a mist separator apparatus that allows the liquid to initially drain into a drainage system and allow the mist to precipitate in a mist collecting container system which is initially separate and distinct from the drainage system. It would also be advantageous to provide a mist separator apparatus that directs the precipitating mist in the mist collecting container to merge downstream with the draining liquids. The present invention satisfies these needs and provides these advantages.

SUMMARY OF THE INVENTION

It is an object of the present invention to provide a mist separator apparatus that effectively and efficiently removes mist and liquids contained within the housing of cutting or forming equipment or other structures.

It is another object of the invention to provide a mist separator apparatus that substantially reduces the amount of mist that is being exhausted by simultaneously increasing the amount of mist that precipitates into liquid for drainage.

Yet another object of the invention is to provide a mist separator apparatus that eliminates the need to periodically clean sludge-like material therefrom.

A still further object of the invention is to provide a mist separator apparatus that allows the liquids to initially drain in a drainage system and allow the mist to precipitate in a mist collecting container which are separate and distinct from each other.

Another object of the present invention is to inhibit the mist from directly migrating from the housing and into the mist collecting container.

A still further object of the invention is to provide a mist separator apparatus that directs the precipitated mist in the mist collecting container to merge downstream with the draining liquid.

Accordingly, a mist separator apparatus for removing a mist and a liquid material from a chamber defined by a structure or housing is hereinafter described. In its broadest form, the mist separator apparatus includes a mist collecting container and a drain tube. The mist collecting container defines a plenum and has a vent and a collecting drain both of which are in fluid communication with the plenum. The mist collecting container is connected to the structure and is in fluid communication with the chamber for receiving the mist into the plenum. The drain tube is connected to and between the structure and the collecting drain and is in fluid communication with the chamber and the collecting drain so that the liquid material flows from the chamber and into the collecting drain.

BRIEF DESCRIPTION OF THE DRAWINGS

These and other objects of the invention will become more readily appreciated and understood from a consideration of the following detailed description of the preferred embodiment of the invention when take together with the accompanying drawings, in which.

DETAILED DESCRIPTION OF THE PREFERRED EMBODIMENT

A mist separator apparatus of the invention removes mist and liquid from a chamber of a structure. The detailed description of the preferred embodiment describes the mist separator of the invention used in conjunction with a conventional wafer slicing machine. However, one of ordinary skill in the art would comprehend that the wafer slicing machine is used by way of example only and that other structures having a chamber containing mist and liquid could require the use of the mist separator apparatus of the invention. Further, a skilled artist would comprehend that the liquid coolant used to cool, for example, a rotating saw blade cutting a hardened workpiece creates a mixture of liquid and solids and perhaps a sludge material. Thus, throughout the description of the preferred embodiment, the resultant liquid will hereinafter be referred to as "liquid material".

Figure 1:
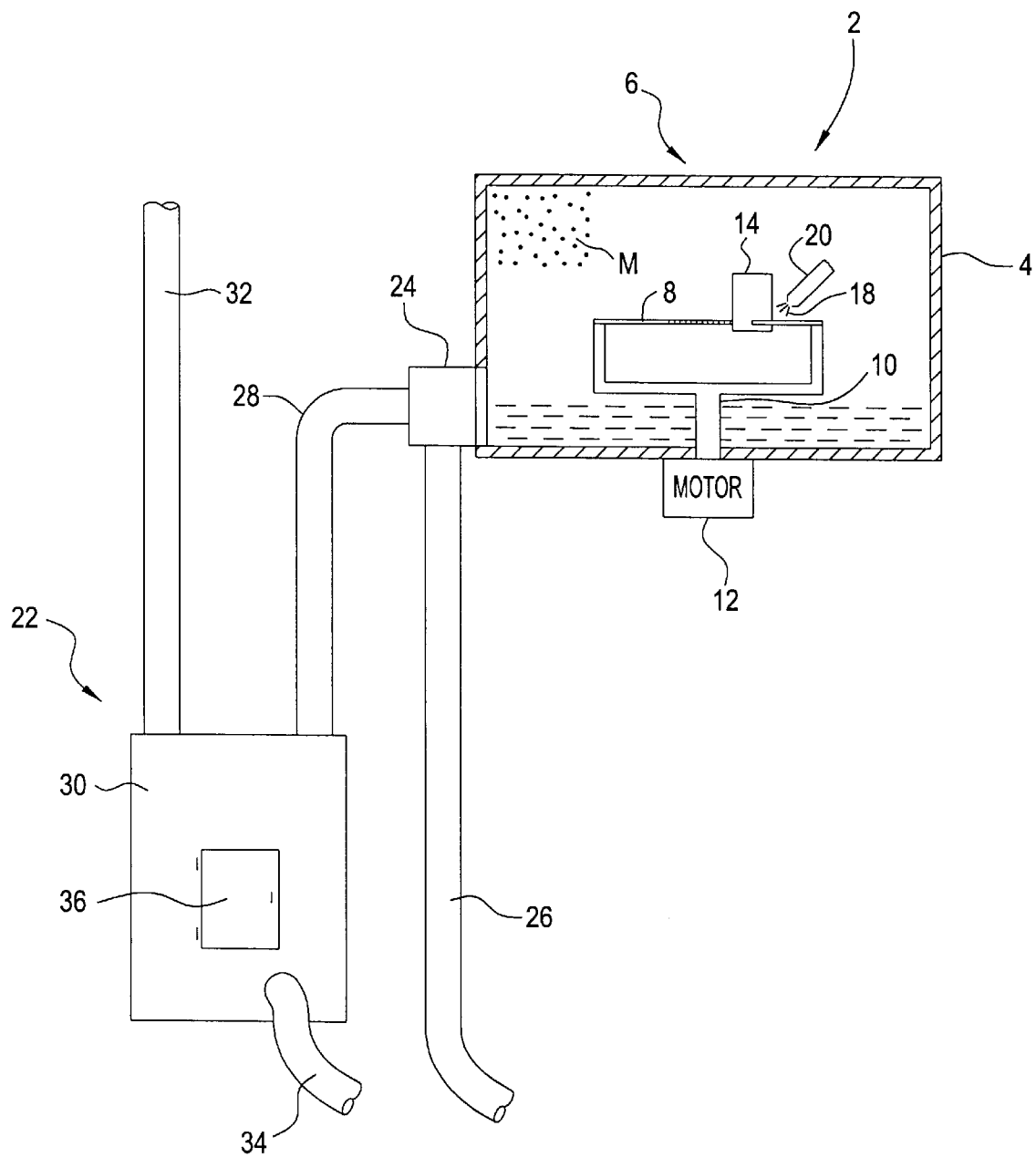
FIG. 1 illustrates a conventional mist separator operably connected to a conventional, schematically-illustrated, wafer slicing machine.
Figure 2:
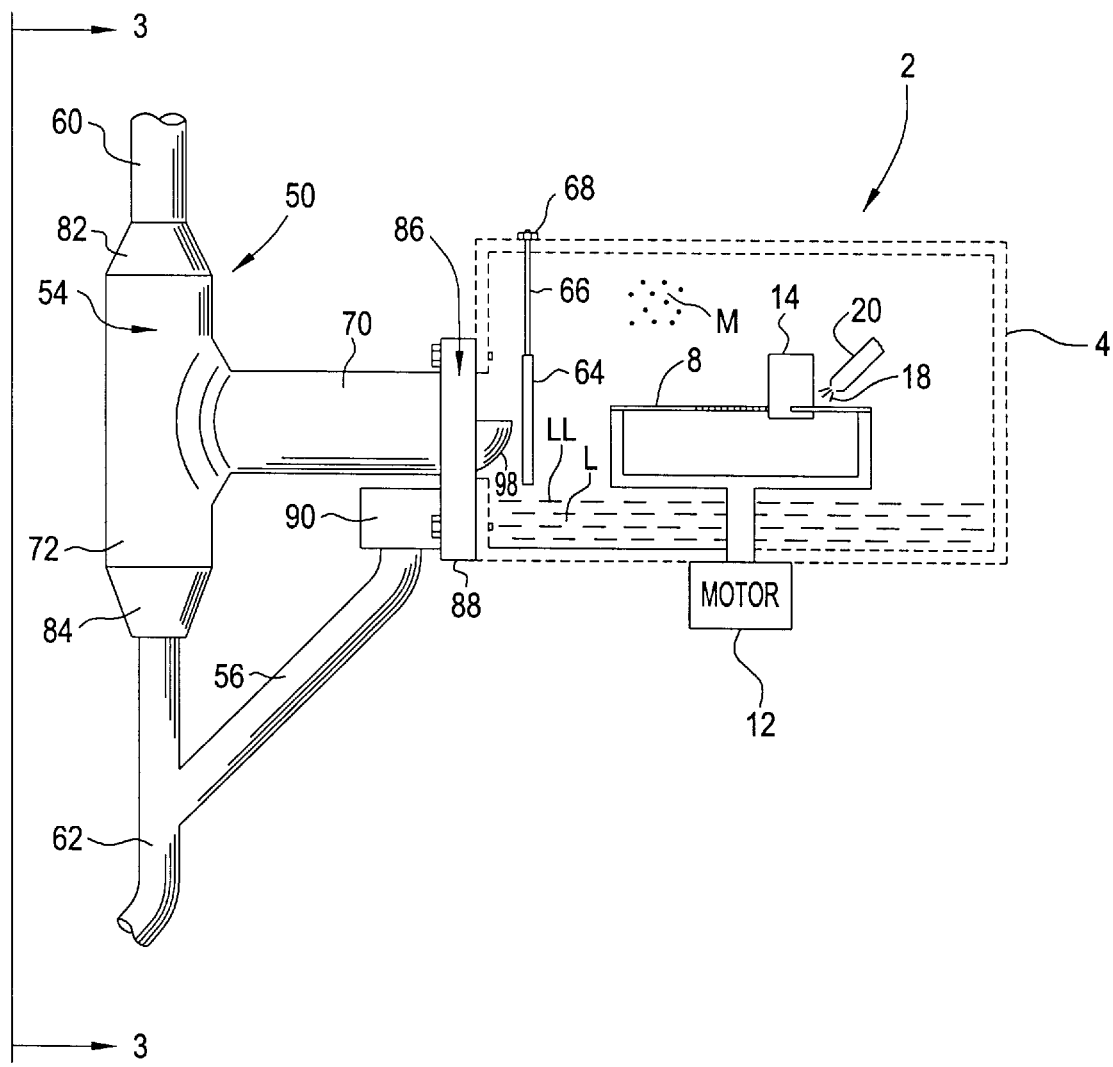
FIG. 2 is a perspective view of a preferred embodiment of a mist separator apparatus of the invention operably connected to a conventional, schematically-illustrated, wafer slicing machine.
Figure 3:
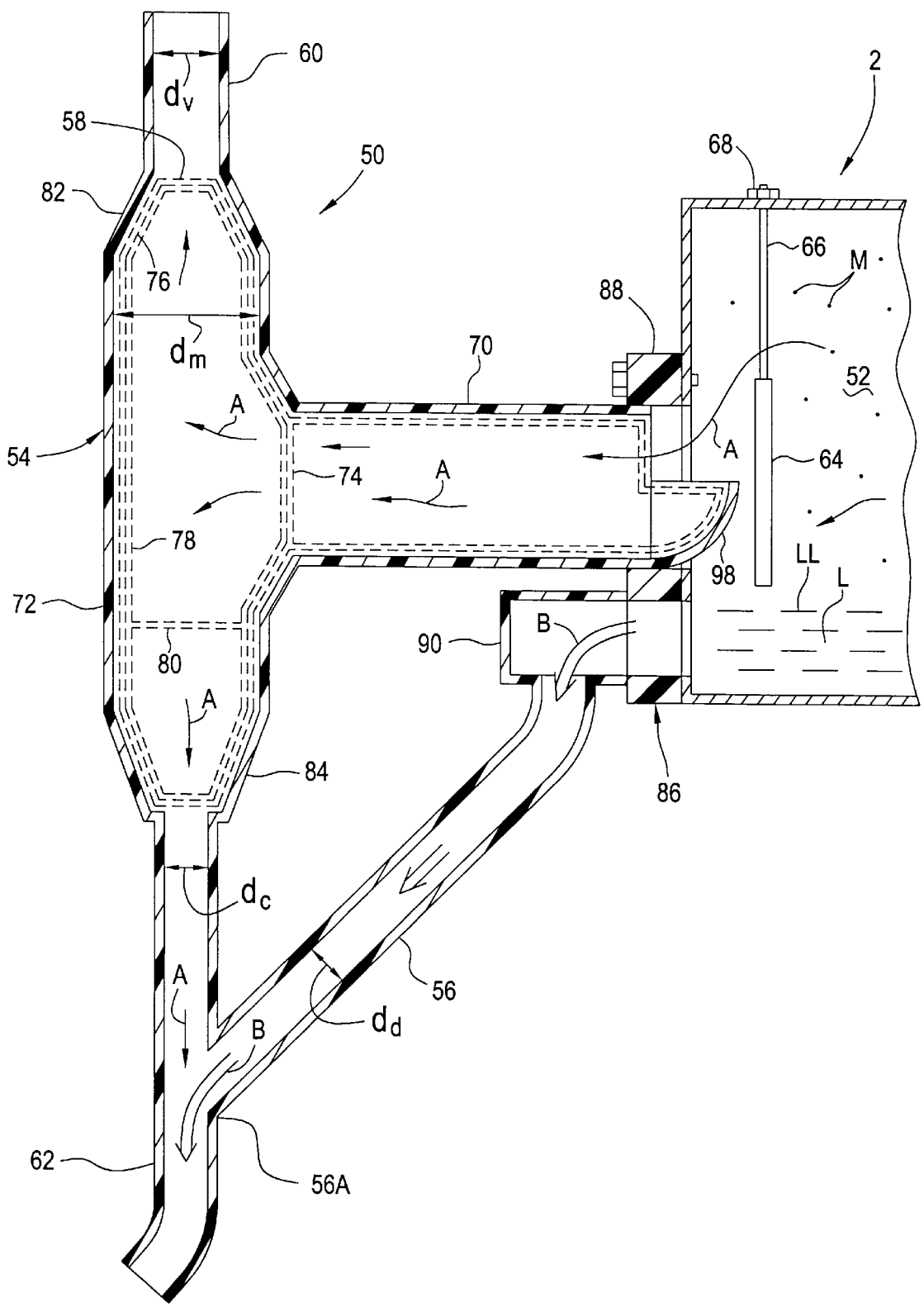
FIG. 3 is a cross-sectional view of the preferred embodiment of the mist separator apparatus of the invention taken along line 3—3 in FIG. 2.

A mist separator apparatus 50 of the present invention is generally introduced in FIGS. 2 and 3. The mist separator apparatus 50 removes a mist M and a liquid material L from the conventional wafer slicing machine 2. The housing 4 of the wafer slicing machine 2 defines a chamber 52 that contains the mist M and the liquid material L. The mist separator apparatus 50 includes a mist collecting container 54 and a drain tube 56. As best shown in FIG. 3, the mist collecting container 54 defines a plenum 58 (illustrated by a dashed line) and includes a vent 60 and an collecting drain 62. The mist collecting container 54 is connected to the wafer slicing machine 2 and is in fluid communication with the chamber 52 for receiving the mist M into the plenum 58.

The drain tube 56 is connected to the wafer slicing machine 2 in a manner discussed in more detail below. Also, the drain tube 56 is connected to the collecting drain 62 at a joint 56A. By these connections, the drain tube 56 permits fluid communication between the chamber 52 and the collecting drain 62 so that the liquid material L flows from the chamber 52 and into the collecting drain 62.

The mist separator apparatus 50 also includes a shield 64 which is disposed within the chamber 52. Although not by way of limitation, the shield 64 is connected to the housing 4 by a conventional fastener 66 which, in this case, is an elongated rod connected at one end to the shield 64 and at an opposite threaded end by a nut 68 to the housing 4. The shield 64 is disposed within the chamber 52 proximate a location where the mist collecting container 54 and the wafer slicing machine 2 are connected. The shield 64 is sized to inhibit the mist M from migrating from the chamber 52 and into the plenum 58 of the mist collecting container 54.

The mist collecting container 54 includes a conduit 70 and main body 72. The conduit 70 extends horizontally to define a horizontal region 74 (illustrated by a dashed line) of the plenum 58. Under normal operating conditions, the horizontal region 74 is disposed above a liquid level LL of the liquid material L in the chamber 52.

The main body 72 extends vertically to define a vertical region 76 (illustrated by a dashed line) of the plenum 58. The vertical region 76 of the plenum 58 is subdivided into an upper subregion 78 and a lower subregion 80 (both of which are illustrated by dashed lines). Under normal operating conditions, the upper subregion 78 is disposed above the liquid level LL of the liquid material L in the chamber 52. It follows that the lower subregion 80 of the plenum 58 is disposed below the liquid level LL of the liquid material L in the chamber 52 during normal operating conditions.

The vent 60 is connected to a first frustoconical section 82 of the main body 72 and is in fluid communication with the upper subregion 78 of plenum 58. The collecting drain 62 is connected to a second frustoconical section 84 of the main body 72 and is in fluid communication with the lower subregion 80 of the plenum 58.

As best shown in FIG. 3, the components of the mist separator 50 of the invention are shown with various inner diameters. The main body 72 has a main body diameter $d_m$, the vent has a vent diameter $d_v$, the collecting drain 62 has a collecting drain diameter $d_c$ and the drain tube 56 has a drain tube diameter $d_d$. The main body diameter $d_m$ is larger than the vent diameter $d_v$, the collecting drain diameter $d_c$ and the drain tube diameter $d_d$. However, the vent diameter $d_v$ is larger than the collecting drain diameter $d_c$. Further, the drain tube diameter $d_d$ and the collecting drain diameter $d_c$ are approximately equal. Specifically, the main body diameter $d_m$ is approximately 1.5 times greater than the vent diameter $d_v$. And the vent diameter $d_v$ is approximately two times greater than the collecting drain diameter $d_c$.

Figure 4:
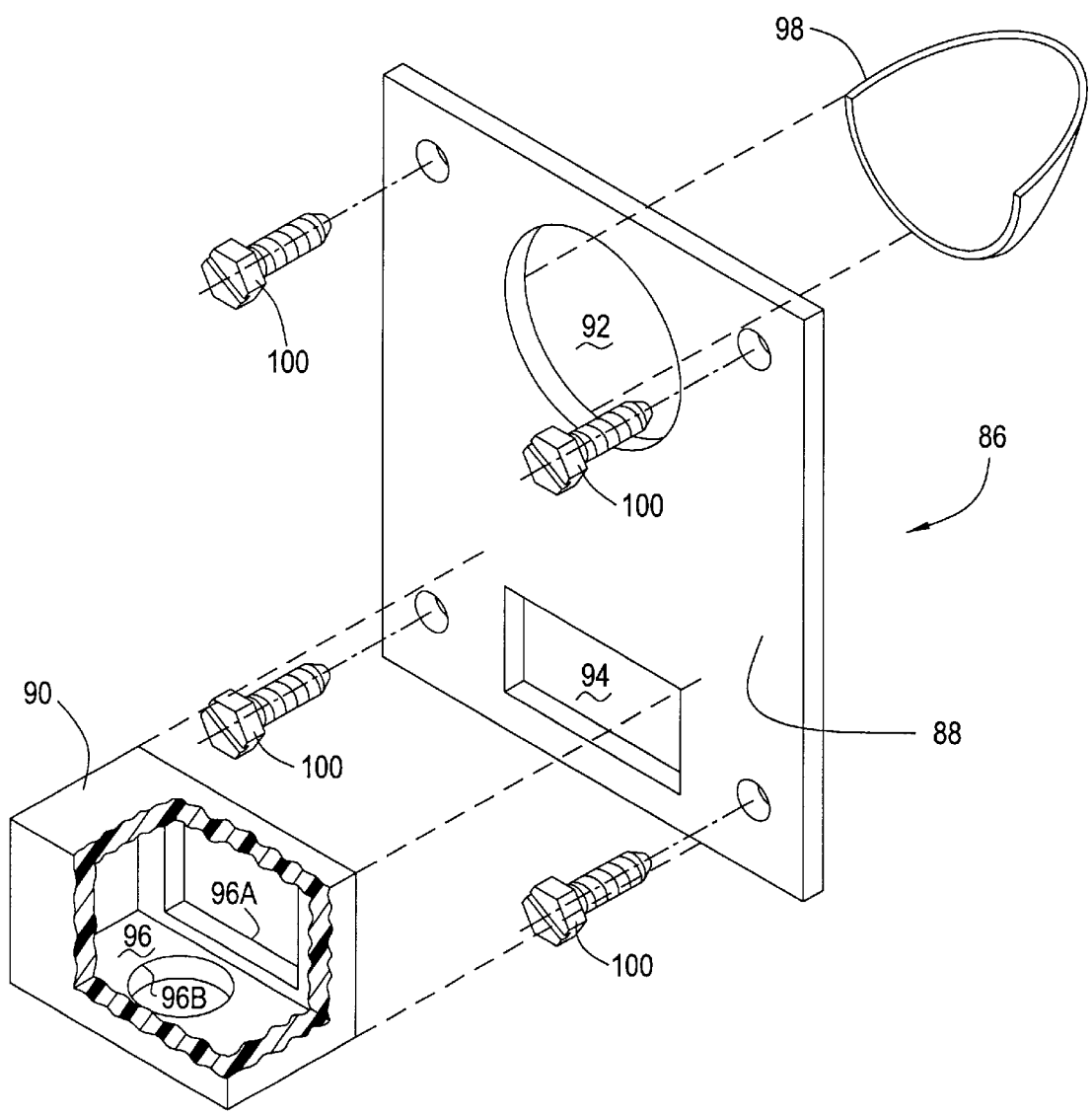
FIG. 4 is an exploded perspective view of a mounting block assembly of the preferred embodiment of the mist separator apparatus of the invention.

Furthermore, the mist separator apparatus 50 of the invention includes a mounting block assembly 86 as best shown in FIG. 4. As shown in FIGS. 2 and 3, the mounting block assembly 86 is connected to the wafer slicing machine 2 and the conduit 70 and the drain tube 56 of the mist separator apparatus 50 of the invention. The mounting block assembly 86 has a mounting panel 88 and a drain header 90 that is connected to the mounting panel 88 by welding or any other conventional means. With reference to FIG. 4, the mounting panel 88 has a first bore 92 that is sized to receive the conduit 70 in order to provide fluid communication between the chamber 52 and the mist collecting container 54. The mounting panel 88 also has a second bore 94 that is used in conjunction with the drain header 90.

As shown in FIG. 4, the drain header 90 includes a channel 96 that extends through the drain header 90. The channel 96 is sized at a first opening 96A to register with the second bore 94 of the mounting panel 88. When the first opening 96A of the channel 96 is in registration with the second bore 94 of mounting panel 88, the header 90 is attached to the mounting panel 88 by welding or any other means commonly known in the art. The channel 96 is sized at a second opening 96B to receive the drain tube 56 in a manner shown in FIGS. 2 and 3 in order to provide fluid communication between the chamber 52 and the drain tube 56 so that the liquid material L is capable of flowing from the chamber 52, through the mounting block assembly 86, and into the drain tube 56.

With reference to FIGS. 2–4, the mounting block assembly 86 also includes a snorkel element 98. The snorkel element 98 is partially received by the first bore 92 of the mounting panel 88 and is secured therein. The snorkel element 98 projects from the first bore 92 and into the chamber 52 towards the shield 64 as best shown in FIGS. 2 and 3 and defines a portion of the plenum 58.

The mounting block assembly 86 is connected to the wafer slicing machine 2 by conventional fasteners 100, such as bolts. However, a skill artisan would appreciate that the mounting block assembly 86 can be connected to the wafer slicing machine 2 by any other attachment means providing the necessary structural integrity.

As shown in FIG. 3, migration of the mist M is illustrated by the single line arrows A and the flow of the liquid material L is represented by the double-lined arrows B. Note that in order for the mist M to migrate into the plenum 58 of the mist collecting container 54 the mist M must circumvent the shield 64. Thus, the mist M or any over spray of the liquid coolant 18 from the nozzle 20 cannot directly enter into the mist collecting container 54. Also, under normal operating conditions, the mist M flows into the plenum 58 while simultaneously the liquid material L flows through the drain tube 56. In brief, the flow of the mist M and the flow of the liquid material L initially flow through separate systems.

However, after the mist M flows into the mist collecting container 54 and begins to precipitate, the precipitated mist flows into the collecting drain 62 which merges with the drain tube 56 at the joint 56A. It is theorized that the flow of the liquid material L at the junction of the drain tube 56 and the collecting drain 62 causes a vacuum in the mist collecting container 54. This vacuum results in attracting the mist M in the mist collecting container towards the collecting drain 62. The benefit of generating this vacuum results in an increased amount of mist M being drained with the liquids while simultaneously reducing the amount of mist that is exhausted through the vacuum-driven vent 60.

Additionally, because the mist M flowing into the collecting drain 62 merges with the liquid material L at the above-described junction, a build-up of sludge is unlikely. Thus, without a sludge build-up, there is no need to clean sludge from the mist separator apparatus 50 of the invention.

Although the invention has been described in connection with the preferred embodiment of the mist separator apparatus, it should be appreciated that modifications or changes may be made to the preferred embodiment of the invention without departing from the inventive concepts contained herein.

What is claimed is:

1. A mist separator apparatus for removing a mist and a liquid material from a chamber defined by a structure, the mist separator apparatus comprising:
   a mist collecting container defining a plenum and having a vent and a collecting drain in fluid communication with the plenum, the mist collecting container connected to the structure in fluid communication with the chamber for receiving the mist into the plenum; and
   a drain tube connected to and between the structure and the collecting drain and in fluid communication with the chamber and the collecting drain so that the liquid material flows from the chamber and into the collecting drain.

2. A mist separator apparatus according to claim 1, further comprising a shield disposed within the chamber proximate a location where the mist collecting container and the structure are connected for inhibiting the mist from migrating from the chamber and into the plenum of the mist collecting container.

3. A mist separator apparatus according to claim 1, wherein the mist collecting container includes a conduit extending horizontally to define a horizontal region of the plenum wherein the horizontal region of the plenum is disposed above a liquid level of the liquid material in the chamber.

4. A mist separator apparatus according to claim 3, wherein the mist collecting container includes a main body extending vertically to define a vertical region of the plenum wherein the vertical region is divided into an upper subregion and a lower subregion whereby the upper subregion of the plenum is disposed above the liquid level of the liquid material in the chamber and the lower subregion of the plenum is disposed below the liquid level of the liquid material in the chamber.

5. A mist separator apparatus according to claim 4, wherein the vent is connected in fluid communication with the upper subregion of the plenum and the collecting drain is connected in fluid communication with the lower subregion of the plenum.

6. A mist separator apparatus according to claim 3, further comprising a mounting block assembly connected to the structure, the conduit and the drain tube, the mounting block assembly including a mounting panel and a drain header connected to the mounting panel, the mounting panel having a first bore sized to receive the conduit to provide fluid communication between the chamber and the mist collecting container and a second bore, the drain header having a channel extending therethrough with the channel sized at a first end to register with the second bore of the mounting panel and sized at a second end to receive the drain tube to provide fluid communication between the chamber and the drain tube so that the liquid material is capable of flowing from the chamber, through the mounting block assembly and into the drain tube.

7. A mist separator apparatus according to claim 6, wherein the mounting block assembly further comprises a snorkel element connected to the mounting panel and projecting from the first bore and into the chamber towards the shield.

8. A mist separator apparatus according to claim 1, wherein the mist collecting container includes a conduit and a main body, the conduit extending horizontally to define a horizontal region of the plenum wherein the horizontal region of the plenum is disposed above a liquid level of the liquid material in the chamber, the main body extending vertically to define a vertical region of the plenum wherein the vertical region of the plenum is divided into an upper subregion and a lower subregion whereby the upper subregion of the plenum is disposed above the liquid level of the liquid material in the chamber and the lower subregion is disposed below the liquid level of the liquid material in the chamber.

9. A mist separator apparatus according to claim 8, wherein the vent is connected in fluid communication with the upper subregion of the plenum and the collecting drain is connected in fluid communication with the lower subregion of the plenum.

10. A mist separator apparatus according to claim 8, wherein the main body has a main body diameter, the vent has a vent diameter and the collecting drain has a collecting drain diameter, the main body diameter being larger than the vent diameter and the collecting drain diameter.

11. A mist separator apparatus according to claim 10, wherein the main body diameter is at least approximately 1.5 times greater than the vent diameter.

12. A mist separator apparatus according to claim 10, wherein the vent diameter is larger than the collecting drain diameter.

13. A mist separator apparatus according to claim 12, wherein the vent diameter is at least approximately two times greater than the collecting drain diameter.

14. A mist separator apparatus for removing a mist and a liquid material from a chamber defined by a structure, the chamber having an upper chamber region containing the mist and a lower chamber region containing the liquid material, the mist separator apparatus comprising:

a hollow body member connected to the structure in fluid communication with the upper chamber region of the chamber for the mist to migrate from the chamber and into the hollow body member; and a drain connected to and between the structure and the hollow body member to provide fluid communication with the lower chamber region of the chamber and the hollow body member for the liquid material to flow from the chamber and into the hollow body member.

15. A wafer slicing and mist separating apparatus, comprising:

a wafer slicing machine having a housing defining a chamber with an upper chamber region for receiving a mist and a lower chamber region for receiving a liquid material discharged during a wafer-slicing operation; and a mist separator apparatus comprising:

a mist collecting container defining a plenum and having a vent and a collecting drain in fluid communication with the plenum, the mist collecting container being connected to the housing and being in fluid communication with the upper chamber region of the chamber for receiving the mist into the plenum; and a drain tube connected to and between the housing and the collecting drain and being in fluid communication with the lower chamber region and the collecting drain so that the liquid material flows from the lower chamber region and into the collecting drain.

16. A wafer slicing and mist separating apparatus according to claim 15, further comprising a shield disposed within the upper chamber region proximate a location where the mist collecting container and the housing are connected for inhibiting the mist from migrating from the upper chamber region and into the plenum of the mist collecting container.

17. A wafer slicing and mist separating apparatus according to claim 15, wherein the mist collecting container includes a conduit and a main body, the conduit extending horizontally to define a horizontal region of the plenum wherein the horizontal region of the plenum is disposed above a liquid level of the liquid material in the chamber, the main body extending vertically to define a vertical region of the plenum wherein the vertical region is divided into an upper subregion and a lower subregion whereby the upper subregion of the plenum is disposed above the liquid level of the liquid material in the chamber and the lower subregion of the plenum is disposed below the liquid level of the liquid material in the chamber.

18. A wafer slicing and mist separating apparatus according to claim 17, wherein the vent is connected in fluid communication with the upper subregion of the plenum and the collecting drain is connected in fluid communication with the lower subregion of the plenum.

19. A wafer slicing and mist separating apparatus according to claim 17, further comprising a mounting block assembly connected to the housing, the conduit and the drain tube, the mounting block assembly including a mounting panel and a drain header connected to the mounting panel, the mounting panel having a first bore sized to receive the conduit to provide fluid communication between the chamber and the mist collecting container and a second bore, the drain header having a channel extending therethough with the channel sized at a first end to register with the second bore of the mounting panel and sized at a second end to receive the drain tube to provide fluid communication between the chamber and the drain tube so that the liquid material is capable of flowing from the chamber, through the mounting block assembly and into the drain tube.

20. A method of removing a mist and a liquid material from a chamber having an upper chamber region containing the mist and a lower chamber region containing the liquid material, the method comprising the steps of:

extracting lighter mist droplets from the upper chamber region while simultaneously inhibiting extraction of heavier mist droplets from the upper chamber region;

draining the liquid material from the lower chamber region; and merging at least a portion of the extracted lighter mist droplets and the drained liquid material exteriorly of the chamber.

21. A method according to claim 20, further comprising the step of venting a remaining portion of the extracted mist to an ambient environment.

22. A method according to claim 20, wherein the chamber is a chamber in a wafer slicing machine.

* * * * *